(12) United States Patent
Clanin

(10) Patent No.: US 9,057,532 B2
(45) Date of Patent: Jun. 16, 2015

(54) RETURN FAN CONTROL SYSTEM AND METHOD

(71) Applicant: Trane International Inc., New York, NY (US)

(72) Inventor: Thomas J. Clanin, La Crescent, MN (US)

(73) Assignee: Trane International, Inc., New York, NY (US)

( * ) Notice: Subject to any disclaimer, the term of this patent is extended or adjusted under 35 U.S.C. 154(b) by 0 days.

(21) Appl. No.: 13/692,712

(22) Filed: Dec. 3, 2012

(65) Prior Publication Data

US 2013/0096722 A1 Apr. 18, 2013

Related U.S. Application Data

(63) Continuation of application No. 12/201,942, filed on Aug. 29, 2008, now Pat. No. 8,326,464.

(51) Int. Cl.
| | |
|---|---|
| *F24F 11/02* | (2006.01) |
| *F24F 11/00* | (2006.01) |
| *G05D 16/20* | (2006.01) |
| *G05D 23/19* | (2006.01) |

(52) U.S. Cl.
CPC ........... *F24F 11/022* (2013.01); *F24F 11/0001* (2013.01); *F24F 2011/0002* (2013.01); *F24F 2011/0006* (2013.01); *F24F 2011/0042* (2013.01); *G05D 16/2066* (2013.01); *G05D 23/19* (2013.01)

(58) Field of Classification Search
CPC ........... F24F 11/0017; F24F 2203/102; B01D 2271/02
USPC .......... 700/41–44, 45, 203, 276, 301; 454/70, 454/238, 255, 340; 165/246, 278–279
See application file for complete search history.

(56) References Cited

U.S. PATENT DOCUMENTS

| | | | | |
|---|---|---|---|---|
| 4,407,185 | A * | 10/1983 | Haines et al. | 454/238 |
| 4,437,608 | A * | 3/1984 | Smith | 236/13 |
| 4,662,560 | A * | 5/1987 | Norris et al. | 236/44 B |
| 4,841,733 | A * | 6/1989 | Dussault et al. | 62/93 |
| 5,092,227 | A * | 3/1992 | Ahmed et al. | 454/61 |
| 5,405,291 | A * | 4/1995 | Alcorn et al. | 454/61 |
| 5,579,993 | A * | 12/1996 | Ahmed et al. | 236/49.3 |
| 5,597,354 | A * | 1/1997 | Janu et al. | 454/229 |
| 5,769,315 | A * | 6/1998 | Drees | 236/49.3 |
| 5,791,408 | A * | 8/1998 | Seem | 165/250 |
| 7,434,413 | B2 * | 10/2008 | Wruck | 62/126 |
| 7,729,788 | B2 * | 6/2010 | Grammatke et al. | 700/56 |
| 7,890,215 | B2 * | 2/2011 | Duncan | 700/276 |
| 2004/0256152 | A1 * | 12/2004 | Dashevskiy et al. | 175/25 |
| 2007/0179678 | A1 * | 8/2007 | Nordberg et al. | 700/300 |
| 2008/0139105 | A1 * | 6/2008 | Kuentz | 454/238 |

* cited by examiner

*Primary Examiner* — Darrin Dunn
(74) *Attorney, Agent, or Firm* — McAndrews, Held & Malloy, Ltd.

(57) ABSTRACT

A return fan control system for an HVAC system comprises a supply fan control loop, a return fan control loop and a building pressure control system. The supply fan control loop comprises a duct pressure controller arranged to control a supply fan to a duct pressure setpoint. The return plenum pressure control loop comprises a return plenum pressure controller arranged to automatically control a return fan to a return plenum pressure setpoint determined by a setpoint reset function. The building pressure control system is operable to control a building pressure. The building pressure control system may comprise a building pressure control loop and an outside air control loop cooperatively arranged to control an exhaust damper in response to an outside air intake.

39 Claims, 7 Drawing Sheets

RETURN FAN CONTROL SYSTEM AND METHOD

CROSS-REFERENCE TO RELATED APPLICATIONS

This application is a continuation of application Ser. No. 12/201,942, filed Aug. 29, 2008, now U.S. Pat. No. 8,326, 464. The patent application identified above is incorporated here by reference in its entirety to provide continuity of disclosure.

FEDERALLY SPONSORED RESEARCH OR DEVELOPMENT

None.

BACKGROUND OF THE INVENTION

This invention relates generally to the field of heating, ventilating, and air conditioning (HVAC) systems and, particularly, to air handling products with an airside economizer, a return fan and a building pressure control requirement. Embodiments of the present invention apply to controls for air handling units with a constant volume or variable volume supply fan, a variable volume return fan, and a central exhaust that are used in commercial rooftop products or other HVAC products with similar design characteristics.

Generally, HVAC systems are used to heat and/or cool building spaces. Such building spaces include single story and multi-story schools, office buildings, and manufacturing facilities, for example. These systems may be unitary or built-up systems, and may be used to condition the air in multiple zones or building spaces.

The HVAC system is a heating/cooling circuit. The HVAC system can comprise: heating or cooling coils for conditioning air, a supply fan to supply air through a supply duct to a building space to be conditioned, a return fan that draws return air through a return duct from a conditioned building space and blows the return air to an exhaust path and/or to a downstream return duct that supplies the return air back to a filter upstream of heating or cooling coils and the supply fan. The return air may also be mixed with outside air used for economizer ("free") cooling that is drawn into an outside air duct connected to the outside and return air mixing box. Other configurations are known. For example, instead of employing a return fan, a relief fan or gravity relief may be employed. In addition, various dampers, pressure gauges, temperature gauges, and motor drives have been employed.

The HVAC system has the complex task of controlling the flow of air fluid through each fluid flow path, e.g., the supply flow path, the outside flow path, the return flow path, and the exhaust or relief flow path. One HVAC system that has been employed is a constant air volume system. A constant air volume system delivers supply air at a constant rate to the space to be conditioned.

Another system that has been employed is the variable air volume system. This system delivers supply air at a variable rate to the space to be conditioned, and has been typically employed due to its capability of improving energy efficiency. When such constant and variable volume systems utilize a return fan as well as a supply fan, for example, such systems provide reasonably good control of the ventilation requirements, pressurization of the building, and relative control of the minimum outside air supplied to the building.

Utilizing a return fan in HVAC systems can help in building pressure control. An HVAC system utilizing a return fan can ensure sufficient return plenum pressure by overcoming the wide-open exhaust damper and exhaust/relief path losses. In addition, a return fan can ensure adequate fan capacity to overcome the return path losses.

For example, supply fans that have been used in conjunction with return fans have been controlled as a function of the HVAC system static pressure. The supply and return air flows are typically volumetrically synchronized to control the building pressure and to control the minimum outside air provided to the building to meet ventilating code requirements. In such systems, the supply and return fans are controlled so that a pre-selected flow rate differential between the return fan and supply fan is maintained, with the return fan having a lower flow rate than the supply fan. The pre-selected flow rate differential between the supply fan and return fan corresponds to the flow of air exhausted from the building to satisfy code requirements. The return fan output is directed back to the input of the supply fans and the difference in flow rate between the supply fan and return fan is made up by connecting an outside air duct to the input of the supply fan, thereby, allowing outside air to flow into the supply fan at a rate approximately equal to the differential between the flows through the supply fan and return fan. The mixture of recirculated and outside air provided to the supply fan may be tempered—heated or cooled—at the input or the output of the supply fan. This arrangement, however, does not provide direct control of building pressure.

Alternatively, a basic method for controlling a return fan in such systems is described in relation to Arrangement 1 in American Society of Heating, Refrigerating and Air-Conditioning Engineers, Inc. Guideline 16-2003 ("Guideline 16-2003"). Supply fan capacity control provides supply duct pressure control, return fan capacity control provides return plenum pressure control, and exhaust damper position control provides building pressure control. This arrangement, therefore, intends to provide direct control of building pressure. Guideline 16-2003 prescribes a strategy to maintain a constant return plenum pressure at all operating conditions. This strategy is described to prevent excessive control loop interaction. But, to maintain decoupling and control stability, the Guideline recommends a difference between the closed-loop response time of the building pressure and return fan functions of at least 5:1.

The current control methods require the return fan to meet a maximum plenum pressure requirement when at the design supply air flow and exhaust air flow rates with a one hundred percent (100%) outside air flow and a zero percent (0%) return air flow. At all other exhaust part-load conditions such as with intermediate return/outside air damper positions, throttled supply air flow and/or for the minimum plenum pressure modes with a one hundred percent (100%) return air flow and a zero percent (0%) outside air flow, the return plenum pressure is controlled to the same maximum pressure setpoint and is not controlled to a lower pressure.

Significant non-linear effects in the system can exist across the range of operating conditions, due to the damper control components and the inherent pressure versus flow relationship in fans, coils, and duct system components. These non-linearities, combined with variable air flow rates, cause significant process gain variation for each controller employed in the HVAC system. That is, when using a conventional, linear PI controller with fixed gain parameters, large variation in the closed-loop response times result. This variability makes it difficult, if not impossible practically, to maintain a 5:1 response time decoupling ratio as prescribed by the Guideline 16-2003.

While in some applications the return plenum pressure can be controlled to a constant pressure (such as a few tenths to one half inches water column), frequently constant pressure should not be used when design compromises and exhaust damper size limitations result in less than ideal air flow characteristics for the exhaust dampers and relief path. Such design tradeoffs and size limitations most frequently occur with packaged HVAC systems, although similar limitations can arise with built-up systems. That is, the resulting pressure loss characteristics of the exhaust path can be much higher than the preferred drop of a few tenths inches water column. In fact, the pressure drop can be as high as or exceed 1.0 inches water column (249.089 Pa) or more. Consequently, in practice, controlling the return plenum pressure to a constant, fixed setpoint value, such as 1.0 inches water column (249.089 Pa), does not work effectively. Such a setpoint value causes balance problems between return air and mixed air pressures.

In particular, excessive return pressure from the return fan disrupts normal system operation. This is especially apparent in minimum ventilation modes with a fixed outside damper position, because the normally negative mixed air pressure will increase and cause a reduction or reversal of outside air intake.

In addition, excessive return pressure beyond the level necessary to provide the required air flow rate reduces energy efficiency. Since the supply fan and return fan are typically operated at variable speeds, with the drive frequency to these being periodically adjusted to control the volume output of each fan, the power consumed by the fans may often be in excess of that necessary to drive the volume of air that the HVAC system requires. Normal variation in thermal loads and ventilation requirements typically drive the variation in supply fan and return fan operating conditions. Other variations in the air flows through the supply fan and return fan can occur due to infiltration or exfiltration of outside air into the building through vents, cracks, etc. Since the outside air infiltrating the building is not conditioned to a set temperature, and is generally either too warm or too cool, the introduction of excess outside air can result in further energy inefficiencies. The introduction of too little outside air can also result in indoor air quality problems.

BRIEF SUMMARY OF THE INVENTION

According to a preferred embodiment of the present invention, a return fan control system for an HVAC system comprises a supply fan control loop, a return fan control loop and a building pressure control system. The supply fan control loop comprises a duct pressure controller arranged to control a supply fan to a duct pressure setpoint. The return plenum pressure control loop comprises a return plenum pressure controller arranged to automatically control a return fan to a return plenum pressure setpoint determined by a setpoint reset function. The building pressure control system is operable to control a building pressure, comprising a building pressure control loop and an outside air control loop. The building pressure control system is operable to substantially attain a building pressure and comprises a building pressure control loop and an outside air control loop cooperatively arranged to control an exhaust damper in response to an outside air intake.

In additional embodiments, the building pressure control loop may further optionally comprise a feedback controller and a feed-forward controller operable to control an exhaust damper in response to a variation of the outside air ventilation. A limit control loop may also be employed with embodiments of the present invention. The limit control loop may be employed to transition the return pressure control loop to the limit control loop when the exhaust damper is in a fully open position and a building pressure setpoint is exceeded. A method of controlling a return fan system employing embodiments of the present invention is also disclosed and contemplated.

In another embodiment, a method is disclosed. The method of controlling an HVAC system having a return fan comprising the steps of: controlling a supply fan with a supply fan control loop, the supply fan control loop further comprising a supply fan controller that controls the supply fan to a duct pressure in relation to a duct pressure setpoint; controlling a return fan with a return plenum pressure control loop; the return plenum pressure control loop comprising a return fan controller arranged to automatically control a return fan to a return plenum pressure, the return plenum pressure being attained by varying a return plenum pressure setpoint with a setpoint reset function; and controlling a building pressure with a building pressure control system.

In yet another embodiment, a method of controlling a return fan in an HVAC system having a return fan control loop is disclosed. The method comprises the steps of: determining a maximum return plenum pressure setpoint that exceeds a return plenum pressure setpoint; calculating a minimum return plenum pressure setpoint; and controlling a return fan with a return fan controller to a return plenum pressure, the return plenum pressure being attained by varying a return plenum pressure setpoint with a setpoint reset function.

Additional advantages and features of the invention will become more apparent from the description of a preferred embodiment of the present invention and the claims which follow.

BRIEF DESCRIPTION OF THE SEVERAL VIEWS OF THE DRAWINGS

The following figures include like numerals indicating like features where possible.

DETAILED DESCRIPTION OF A PREFERRED EMBODIMENT

As a preface to the detailed description, as used in this specification and the appended claims, the singular forms "a," "an," and "the" also include plural referents, unless the context clearly dictates otherwise.

Figure 1:
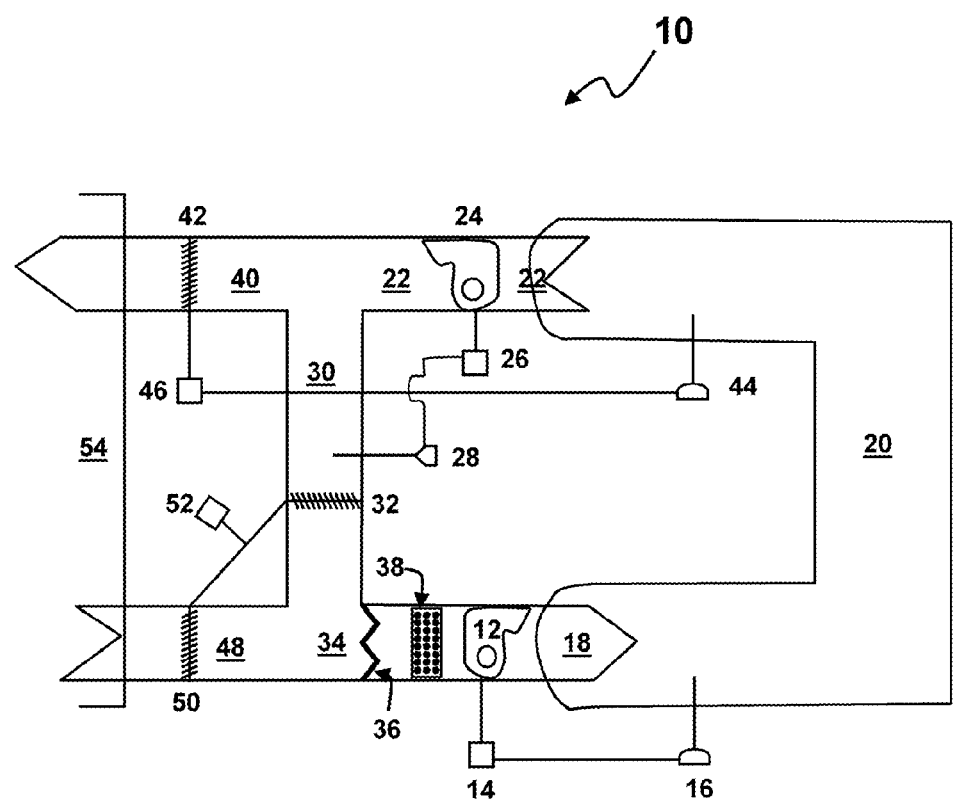
FIG. 1 is a diagram of an embodiment of the invention that includes components of the HVAC system for conditioning one or more separate building spaces (or zones).

Referring to FIG. 1, a heating, ventilating, and air conditioning (HVAC) system 10 for heating and/or cooling building spaces is depicted, along with basic components discussed further below. The HVAC system 10 may include many other conventional features not depicted for simplicity of the drawings. In addition, values or ranges of values for HVAC system 10 parameters, subsystems thereof, are provided for illustrative purposes. It should be understood that other values or ranges of values for system parameters may be used depending on system needs and remain within the scope and spirit of embodiments of the present invention.

The HVAC system 10 is directed to systems in the range of about 20 to 200 tons or larger. Embodiments of the present invention apply most typically to HVAC systems with a return fan used in commercial rooftop products or other HVAC products with similar design characteristics, in both unitary and applied air handling products.

Referring now generally to FIGS. 1-7, HVAC system 10 is arranged to control the return fan capacity. This control arrangement allows the air handling system to simultaneously control and maintain the required supply duct pressure, building pressure, return plenum pressure, and outside air flow rate for ventilation, economizing, or non-ventilating modes.

In the embodiment depicted in FIG. 1, the HVAC system 10 comprises a supply fan 12, a supply fan variable frequency drive 14, a duct pressure sensor 16 connected to at least a supply fan variable frequency drive 14, a supply duct 18, a building space or zone 20, a return duct 22, a return fan 24, a return fan variable frequency drive 26, a return air pressure sensor 28 connected to at least the return fan variable frequency drive 26, a recirculation duct 30, a recirculation air damper 32, a mixed air plenum or space 34, a filter rack 36, a conditioning unit 38, an exhaust duct 40, an exhaust damper 42 connected to at least a building space pressure sensor 44 and an exhaust damper modulator 46, an outside air duct 48, an outside air damper 50, a mixed air flow modulator 52 connected to at least a recirculation air damper 32 and an outside air damper 50. A control unit, not shown, is connected to and controls the various components of the HVAC system 10, such as the sensors and variable frequency drives. For example, the control unit can send control signals in response to various signals received from components of the HVAC system 10.

Also, as should be understood, a variable air volume box, more commonly called a VAV box, may comprise one or more components of the HVAC system 10. Note that, in general, variable frequency drives and/or inlet guide vanes can be used to control fan capacity (variable frequency drives are shown in FIG. 1.) A combination of more or less components may be included in such an HVAC system 10; that is, other configurations are contemplated and should be readily appreciated.

Specifically, in FIG. 1, a supply fan 12 has a motor (not shown) driven by a supply fan variable frequency drive 14. In general, various fan types for use in HVAC system 10 are contemplated, including centrifugal, axial or mixed flow, and could be selected based on known considerations, including noise, efficiency, space constraints, cost, and size of the application. The supply fan 12 may be a variable air volume or constant volume supply fan. In addition, other means may also be used to vary the air flow through the supply fan 12, such as variable inlet vanes at the fan inlet, discharge dampers at the fan discharge, or any other means of altering the air flow rate through the supply fan 12.

The supply fan 12 draws air through a filter rack 36 and a conditioning unit 38. The conditioning unit 38 may consist of one or more cooling and/or heating coils that are located upstream, downstream, or both, of the supply fan 12. Supply duct 18 forms a flow path for receiving outside air and/or return air and for discharging conditioned air to one or more spaces or zones 20 to be conditioned in a building structure. The HVAC system 10 may contain one or more dampers (not shown), for example, from the building space 20, to further modulate the air flow into the space 20. The supply fan rate at which the supply fan 12 delivers air to the supply duct 18 in one embodiment is set in response to a control signal that varies, either directly or indirectly, upon loading conditions of the building space 20.

The conditioned air from the building space 20 is drawn into a return duct 22. The return duct 22 is connected to the inlet side of a return fan 24 driven by an electric motor (not shown). The return fan 24 may be a variable frequency or constant volume fan. The return fan 24 may be similar to the supply fan 12 in construction and method of operation.

The return fan 24 draws return air into the return duct 22 at or upstream of the return fan 24 and then discharges the return air in the return duct 22 downstream of the return fan 24. A portion of the return air can flow into the exhaust duct 40 and/or the recirculation duct 30. The recirculation duct 30 is connected to a plenum space or chamber 34.

Any return air from the return duct 22 that flows into the recirculation duct 30 is mixed in the plenum space 34 with outside air intake 102, if any, from the outside space 54 that flows through an outside air damper 50 and an outside air duct 48. The mixing in and around the plenum space 34 of return air delivered through the recirculation duct 30 and outside air delivered through the outside air duct can occur when the outside air damper 50 is in an open or a partially open state. The relative amount of outside air in the supply air duct 18 is typically varied and can depend on the open/closed state of a recirculation air damper 32 in recirculation duct 30 and the outside air damper 50 that is arranged along outside air duct 48.

The recirculation air damper 32 and outside air damper 50 are shown in the embodiment of FIG. 1 as connected at least to a mixed air flow modulator 52. Mixed air modulator 52 can open, partially open or close the dampers based on control signals sent from control unit is response to the HVAC system loading conditions. The outside air damper 50 could be a TRAQ™, a commercial integrated damper product that automatically monitors and adjusts ventilation rates to desired levels and that is commercially available from the assignee of the present invention. The outside air damper 50 could be a non-TRAQ outside air damper.

An exhaust duct 40 is used for relieving the HVAC system 10, if desired, of a portion of the return air to the outside space 54. Arranged along the exhaust duct 40 is an exhaust damper 42. In FIG. 1, the exhaust damper 42 is illustrated as modulated with an exhaust damper modulator 46. The exhaust damper modulator 46 is shown connected to at least the building space pressure sensor 44, and can modulate the exhaust damper 42 in a ratio based on the differential pressure of the building space 20.

Figure 2:
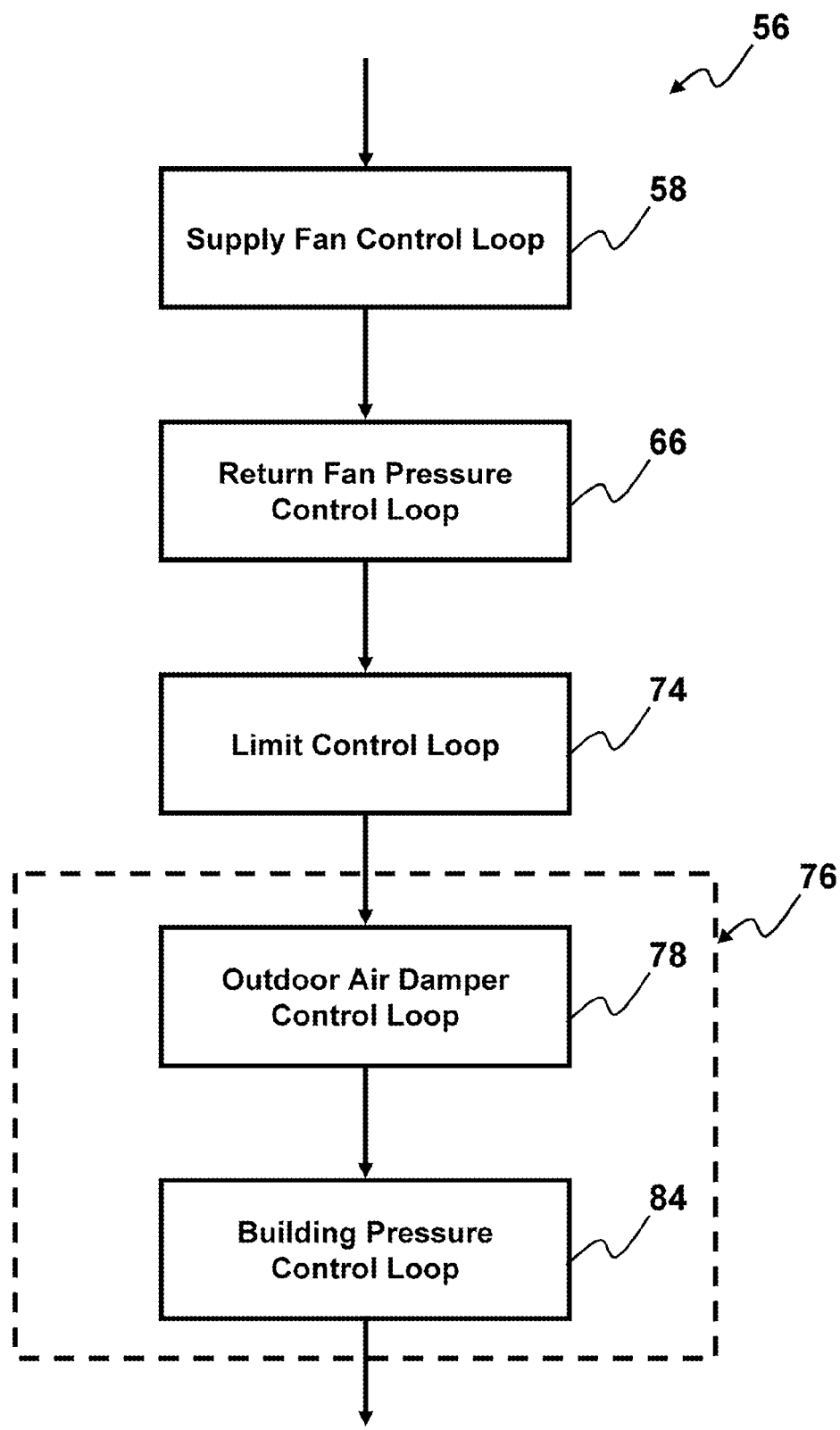
FIG. 2 is a block circuit diagram of a control system according to an embodiment of the present invention.

The HVAC system 10 is controlled by various control loops. Control loops can be located variously, including within a control unit, not shown. As illustrated in FIG. 2, one such control loop comprises a return fan control system 56. The return fan control system 56 comprises: a supply fan control loop 58, a return plenum pressure control loop 66, and a building pressure control system 76. The building pressure control system 76 further comprises an outside air control loop 78 and a building pressure control loop 84. A limit control loop 74 can optionally be incorporated, as shown in FIG. 1, if desired to protect against undesirable limit conditions, such as excessive building pressure. Other control loops may be integrated with the return fan control system 56.

For example, before or after an HVAC system 10 initialization, a timed control loop could be run in a sequence of the supply fan control loop 58, the return plenum pressure control loop 66, and then the building pressure control system 76. The loops of the return fan control system 56 can operate concurrently, in sequence or in other known ways, in accord with embodiments of the present invention. The operational order of these loops in FIG. 2 is for illustrative purposes only.

The return fan control system 56 controls the HVAC system 10 based on the pressure, temperature, and flow conditions of the HVAC system 10. Embodiments of the present system, decouple the interaction between control loops, and therefore, improve stability, control and performance. The return fan control system 56 is capable of accounting for basic principles of HVAC system operation, approximations and idealizing assumptions, and system information available from the one or more controllers.

Control loops of the return fan system 56 cooperate to automatically vary the return plenum pressure 68 in a continuous function between two desired operating limits: a maximum return plenum pressure 68a and a minimum return plenum pressure 68b. The condition of maximum return plenum pressure 68a typically occurs with operation modes at about a one hundred percent (100%) outside air flow rate and about a zero percent (0%) return air flow rate. The minimum return plenum pressure 68b condition typically occurs with operation modes at about a one hundred percent (100%) return air flow rate and a zero percent (0%) outside air flow rate. The minimum return plenum pressure 68b can usually be maintained near 0.1 inches water column (28.91 Pa) to provide the correct balance condition between the supply fan 12 and the return fan 24. By employing embodiments of the present control loops permit part-load conditions between the maximum return plenum pressure 68a and the minimum return plenum pressure 68b, such as where an intermediate positions of the recirculation damper 32 and the outside air damper 50 and/or a throttled supply air flow occur, the return plenum pressure 68 can be controlled to a lower pressure.

Generally, the control loops comprising the return fan control system 56 each include a controller: duct pressure (supply fan) controller 64, return fan controller 72 and the building pressure controller 90, for example. Each controller can be a suitable electronic device. A suitable electronic device could be a programmable logic, a personal computer or other embedded computing capable device. Each controller can send and/or receive power signals, speed signals, temperature signals, pressure or pressure differential signals, or other signals, and can communicate with other components of the HVAC system 10. The controller includes a set of commands or a program. The commands can be accessed, changed, stored and can be created using commonly available programming language, for example. Each control loop in the return control system 56 will now be discussed in turn.

Figure 3:
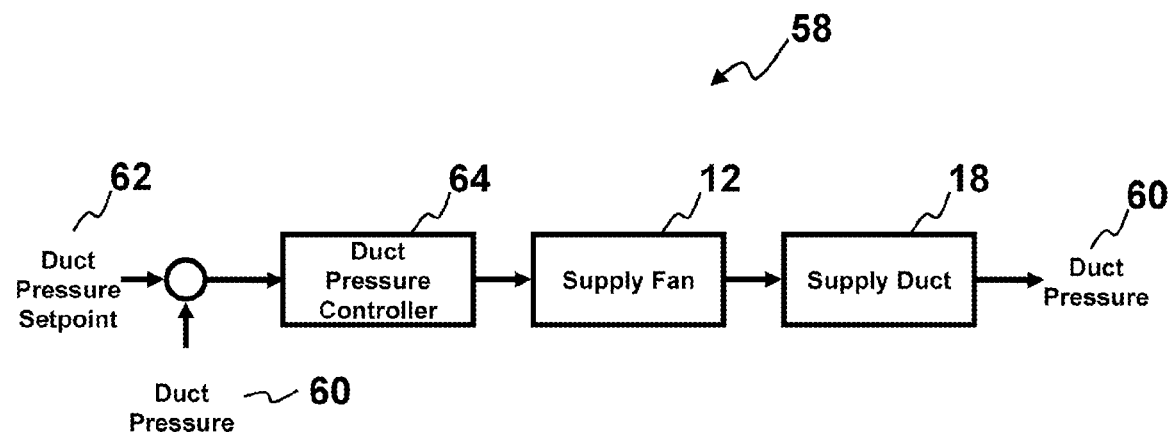
FIG. 3 is a block circuit diagram of a supply fan control loop according to an embodiment of the present invention.

FIG. 3 illustrates an embodiment of the supply fan 12 as controlled in a supply fan control loop 58. The supply fan variable frequency drive 14 command has a variable frequency drive frequency that can be set proportional to speed of the supply fan 12. The supply flow rate is based on the signal of the duct pressure controller 64. The duct pressure controller 64 sends one or more signals to the supply fan 12 or supply fan variable frequency drive 14 in response to a pressure differential between the duct pressure 60, as detected by the duct pressure sensor 16, and the duct pressure setpoint 62. If the supply fan 12 is a constant volume supply fan, the supply air flow rate can be treated as constant. Different methods to control the supply fan are known and can be employed in embodiments of the present invention.

A supply fan control loop 58 generates a pressure differential between a duct pressure 60 and a duct pressure setpoint 62. A duct pressure controller 64 comprises a proportional-integral controller, although other methods are contemplated (e.g., proportional only or proportional-integral-derivative controllers), that corrects deviations between the duct pressure 60 and the duct pressure setpoint 62. A duct pressure controller 64 can also be arranged to respond to non-linear system behavior with use of fuzzy logic, model-predictive control, artificial intelligence, adaptive control, or scheduled logic, for example.

In some preferred embodiments, the duct pressure setpoint 62, the duct pressure 60 and other parameters, such as a supply fan control signal, a proportional gain, a reset time, a duct pressure deadband, a supply air high limit, can, and typically do, vary during operation. A time control interval can be, and typically is, a constant. The duct pressure 60 could range from 0.0 inches water column (0 Pa) to above about 9.0 inches water column (2.2 kPa) or more. The duct pressure setpoint 62 could range from below about 0.75 inches water column (186.8 Pa) to above about 5.0 inches water column (1.3 kPa) or more, which could have a default setting of about 2.0 inches water column (498.2 Pa). The duct pressure deadband could vary over a range of about 0.05 inches water column (12.5 Pa) to about 2.0 inches water column (498.2 Pa), depending on operating conditions in the HVAC system 10.

The duct pressure controller 64 outputs one or more control signals to the supply variable frequency drive 14 to modulate the speed of the supply fan 12. The control signal output by the duct pressure controller 64 typically causes the supply fan speed to modulate in a ratio dependent on the magnitude of the differential pressure. The supply fan 12 can be modulated to operate over the range of zero to one hundred percent capacity.

For example, a control signal output by the duct pressure controller 64 could call for a minimum voltage operation of the supply fan 12 such that there is a minimum speed or fully closed inlet guide vane condition. The output control signal could also call for a maximum voltage condition for the supply fan 12 where the supply fan 12 operates at maximum speed or fully open inlet guide vane position. The output control signal could call for an intermediate voltage condition for the supply fan 12, where the supply fan 12 operates at an intermediate speed and/or inlet guide vane position.

By way of a further illustration, in connection with the supply fan 12, duct pressure controller 64 maintains the required duct pressure 60, for example. As the HVAC system 10 responds to the space temperature control demand, duct pressure 60 is regulated to the desired duct pressure setpoint 60 to save fan energy and prevent over-pressurization of the supply fan 12 discharge and the supply duct 18.

Figure 4:
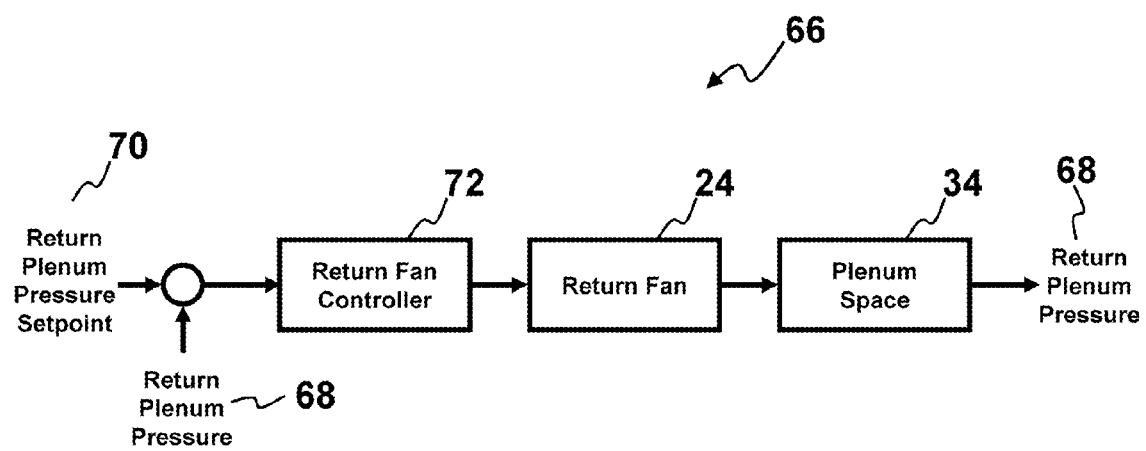
FIG. 4 is a block circuit diagram of a return fan control loop according to an embodiment of the present invention.

Referring now to FIG. 4, the return fan 24 generally assists in the delivery of supply air by overcoming pressure losses in the return duct 22. The return fan 24 is controlled to maintain sufficient return plenum pressure 68 so that the required exhaust air flow rate can be maintained through the exhaust damper 42. The return fan controller 72 facilitates proper intake and control of outside air as a function of the position of outside air damper 50 by compensating for changes in the return air pressure and the mixed air pressure. The outside air damper 50 position can be set proportional to the fraction of outside air received in the HVAC system 10. This can provide a basic model for the mixed air control characteristics.

For example, the return fan controller 72 controls the flow rate of the return fan 24. The return fan controller 72 sends one or more signals to the return fan 24 or the return fan variable frequency drive 26 in response to a pressure differential between the return plenum pressure 68, as detected by the return pressure sensor 28, and the return plenum pressure setpoint 70.

The return fan control loop 66 generates a differential pressure between the return plenum pressure 68 and the return plenum pressure setpoint 70. The return fan controller 72 comprises a proportional-integral controller, although other methods are contemplated (e.g., proportional only or proportional-integral-derivative controllers), that correct deviations between the return plenum pressure 68 and the return plenum pressure setpoint 70. Return fan controller 72 can also be arranged to respond to non-linear system behavior with use of a fuzzy logic control, a model-predictive control, an artificial intelligence control, an adaptive control, or a scheduled logic control, for example.

In some embodiments of the return fan controller 72, the proportional gain term could vary as percentage of the volume output of the return fan 24 to the sensed pressure. The return fan controller 72 outputs one or more control signals to the return fan variable frequency drive 26 to modulate the speed of the return fan 24. The control signal output by the return fan controller 72 typically causes the speed of the return fan 24 to modulate in a ratio depending on the magnitude of the differential pressure between the return plenum pressure setpoint 70 and the return plenum pressure 68. The return fan 24 could be modulated to operate over the range of zero to one hundred percent capacity.

For example, a control signal output from the return fan controller 72 could call for a minimum voltage condition of the return fan 24 such that the return fan 24 will operate at a minimum speed condition. The control signal could output a call for a maximum voltage condition of the return fan 24 such that the return fan 24 will operate at a maximum speed condition. The control signal could call for a voltage condition between the maximum and minimum voltage condition for the return fan 24, where the return fan 24 operates at an intermediate speed. The return fan controller 72 automatically adjusts for HVAC system 10 operating conditions by using existing controller data.

An embodiment of the return fan controller 72 employs a setpoint reset function to calculate the return plenum pressure setpoint 70. The setpoint reset function is used to calculate the return plenum pressure setpoint 70 so that the exhaust damper 42 remains controllable at partially open positions as the operating conditions of HVAC system 10 change.

The setpoint reset function utilizes at least two setpoints to reset the return plenum pressure setpoint 70: a maximum return plenum pressure setpoint 70a and a minimum return plenum pressure setpoint 70b. The maximum return plenum pressure setpoint 70a is preferably a user-adjustable setpoint. The minimum return plenum pressure setpoint 70b can be a fixed value, such as 0.1 inches water column (28.91 Pa), or preferably a user-adjustable setpoint.

The user-adjustable maximum return plenum pressure setpoint 70a allows for field adjustment as needed. The user-adjustable maximum return plenum pressure setpoint 70a is normally determined at system startup as part of the balancing procedure, and allows for field adjustment as needed. In particular, the user-adjustable maximum return plenum pressure setpoint 70a corresponds to the full-load exhaust flow rate when the unit is supplying the design air flow rate with one hundred percent (100%) outside air (while maintaining the required building pressure). A fixed maximum return plenum pressure setpoint could be employed as an alternative. Generally, a small differential return pressure should be added to the return plenum pressure setpoint 70 to provide additional operating margin for the return fan controller 72.

The return fan controller 72 has at least two different implementations based on whether the return fan controller 72 responds to direct measurement of outside air flow or not. In the case of direct measurement of the outside air flow measurement, the outside air flow is directly measured and normalized. The return plenum pressure setpoint 70 is computed using the following relation:

$$RP_{set}=RP_{min}+(RP_{max}-RP_{min})*(OA_{meas})^2 \quad\quad (a)$$

where $RP_{set}$ is the return plenum pressure setpoint 70, $RP_{min}$ is the return plenum pressure minimum 70b, $RP_{max}$ is the return plenum pressure maximum 70a and $OA_{meas}$ is the outside air flow measurement. The minimum return plenum pressure setpoint 70b can be, and typically is, set to near 0.1 inches water column (28.91 Pa) for HVAC system 10 operation modes with one hundred percent (100%) return air flow and zero percent (0%) outside air flow. Such a minimum return plenum pressure setpoint 70b can provide the correct balance condition between the supply fan 12 and return fan 24.

At a fixed, arbitrary position of the exhaust damper 42, the exhaust flow rate squared is assumed proportional to the return plenum pressure 68. The above relationship (a) for $RP_{set}$ assumes this characteristic. Other relationships could be employed. If used, $RP_{set}$ can be modified accordingly to provide the necessary return plenum pressure relationship as a function of $OA_{meas}$. For example, if (exhaust flow rate)$^{1.6}$ is assumed proportional to the return plenum pressure 68, $RP_{set}$ would be defined as:

$$RP_{set}=RP_{min}+(RP_{max}-RP_{min})*(OA_{meas})^{1.6} \quad\quad (b)$$

In general, the reset relationship $RP_{set}$ provides an accurate model of the physical system behavior for the expected increase in $RP_{set}$ to achieve the required response in exhaust air flow rate. As outside air flow rate 92 increases, the exhaust air flow rate increases, by about same magnitude as the outside air flow rate 92 increase, to keep the building pressure 86 constant.

If the outside air flow is not measured, then an estimate of outside air flow can be used. The estimate is generated depending on if the supply fan 12 is a VAV or not. If the supply fan 12 is a VAV, then supply flow rate is set equal to the supply fan command signal. Otherwise, the supply flow rate is assumed to be at its maximum. The outside air flow is estimated based on the following relationship:

$$OA_{est}=0.0001*\text{Supply fan flow rate}*OA_{damperpos} \quad\quad (c)$$

where $OA_{est}$ is the outside air flow estimate, 0.0001 is a constant based on the supply flow percentage divided by the outside air damper percentage, the supply fan flow rate is the rate based on whether flow is through a VAV or not; and the $OA_{damperpos}$ is the percentage of opening in the outside air damper 50. The return plenum pressure setpoint 70 is computed using the following relation:

$$RP_{set}=RP_{min}+(RP_{max}-RP_{min})*(OA_{est})^2 \quad\quad (d)$$

where $RP_{set}$ is the return plenum pressure setpoint 70, $RP_{min}$ is the return plenum pressure minimum setpoint 70b, $RP_{max}$ is the return plenum pressure maximum setpoint 70a and $OA_{est}$ is the outside air flow based on the computational estimate.

In some preferred embodiments, the return plenum pressure 68 could range from −1.0 inches water column (−289.1 Pa) to above about 4.0 inches water column (1.16 kPa) or more. The return plenum pressure setpoint 70 could range from about 0.1 inches water column (28.91 Pa) to above about 2.5 inches water column (727.7 Pa) or more.

During operation the return plenum pressure setpoint 70, the return plenum pressure 68, and other parameters, such as a return fan control signal, a proportional gain, a reset time, a return pressure deadband, a return plenum pressure maximum, can, and typically do, vary depending on operating conditions. The maximum return plenum pressure setpoint 70a can be, and typically is, set to vary between about 0.1 inches water column (28.91 Pa) to about 1.5 inches water column (433.6 Pa). A time control interval, a minimum return plenum pressure setpoint and a return plenum pressure high limit can be, and typically are, set as constants. As discussed below, a limit control can be applied to this controller as well.

Figure 5:
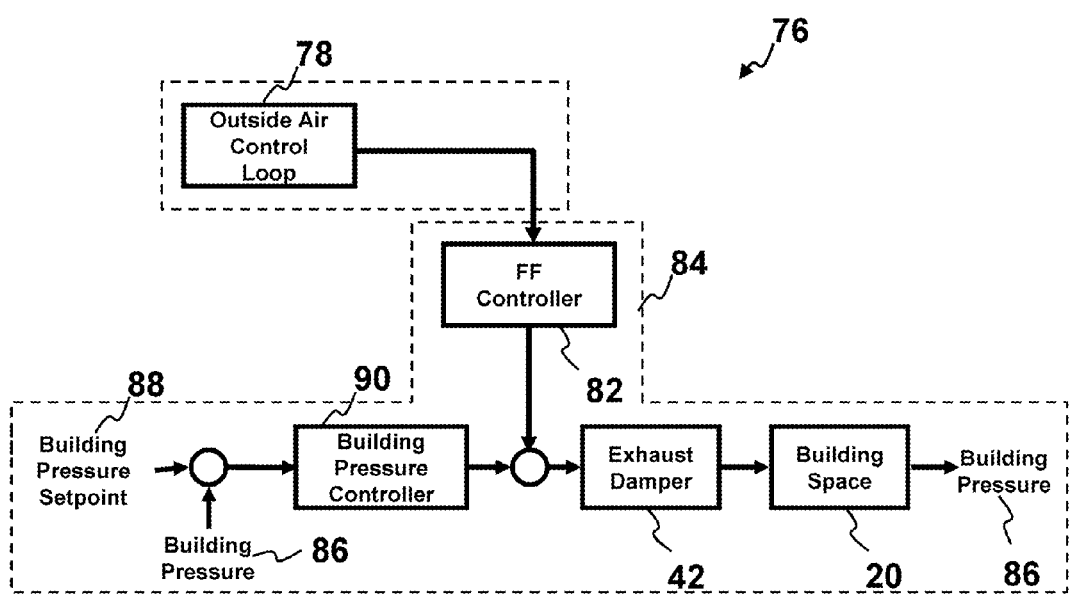
FIG. 5 is a block circuit diagram of a building pressure control system according to an embodiment of the present invention.

Referring now to FIG. 5, building or space pressure 86 is controlled by modulating the exhaust damper 42 position to vary the exhaust air flow rate in conjunction with control of the outside air damper 50. The building pressure control system 76 maintains the desired building pressure 86 by modulating the exhaust damper 42 to provide exhaust flow rate control. The exhaust damper 42 position is controlled by a proportional-integral controller (other control is possible if desired) that can include an outside air feed-forward controller 82. Other methods are contemplated, for example, proportional only or proportional-integral-derivative controllers or other controllers capable of responding to non-linear system behavior, for example, a fuzzy logic control, a model-predictive control, an artificial intelligence control, an adaptive control, or a scheduled logic control.

Release of exhaust air can provide relief of over-pressurization of the HVAC system 10 that would otherwise result from an increase in outside air intake 102. During normal operation, outside air flow rate 92 changes occur primarily from outside air economizing and from variation in supply air flow rate in response to the supply duct pressure control. To maintain a fixed building pressure 86, the exhaust flow rate must increase or decrease accordingly to match changes in the outside air flow rate 92.

The building pressure control system 76 comprises a building pressure control loop 84 and an outside air control loop 78. The building pressure control loop 84 in one embodiment comprises an outside air feed-forward controller 82 and reduces the increase in building pressure 86 due to an increase in outside air flow rate 92.

The outside air feed-forward controller 82 operates incrementally so that a desired change in exhaust damper position is computed for each successive calculation of the outside air control loop 78. The building pressure control loop 84 will typically first suppress small signal noise from the outside air control loop 78.

The outside feed-forward controller 82, if employed, receives outside damper position signal 80. The outside air feed-forward controller 82 computes the change in position of the outside air damper 50 from the outside damper position signal 80. The outside air feed-forward controller 82 contributes as conditions may require to modulate the exhaust damper 42 between an open, partially open and closed position.

Figure 6:
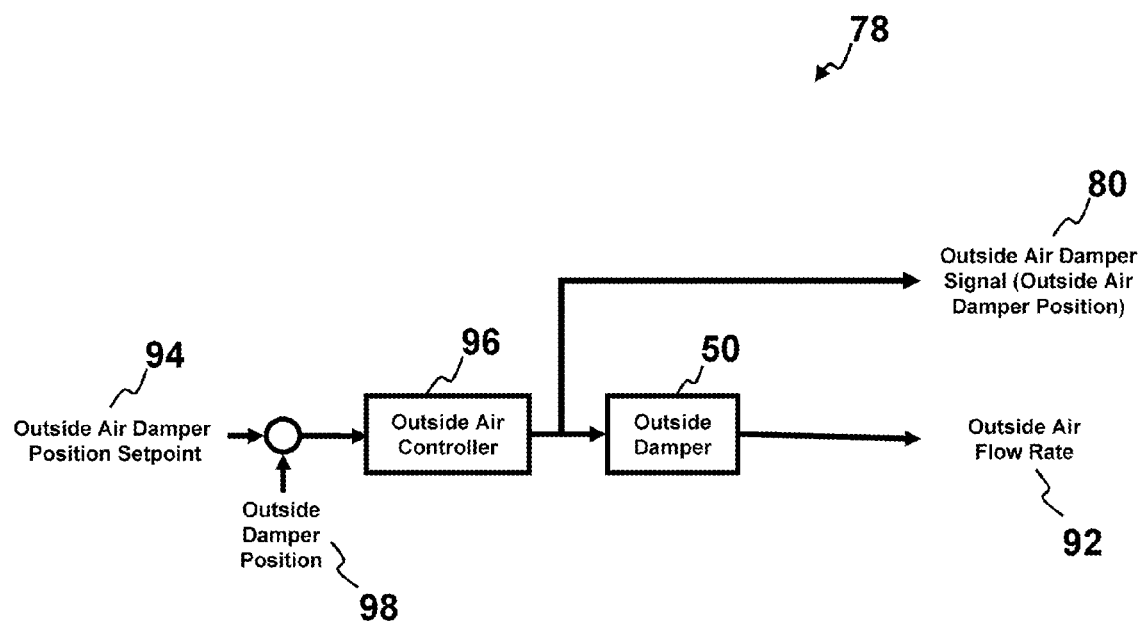
FIG. 6 is a block circuit diagram of an outside air control loop without outside air flow rate sensing according to an embodiment of the present invention.
Figure 7:
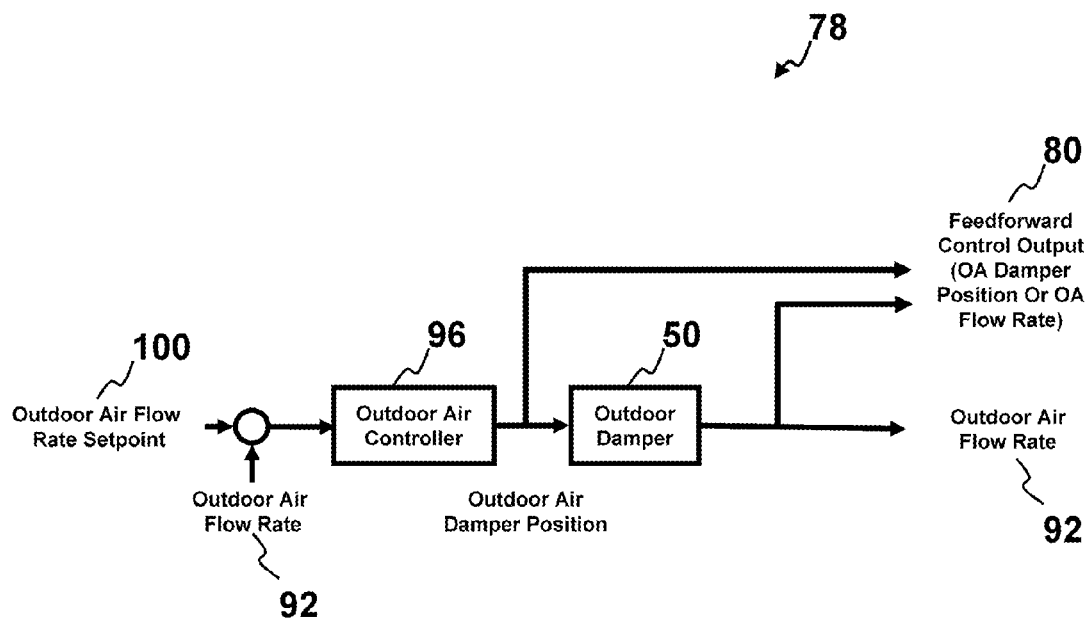
FIG. 7 is a block circuit diagram of an outside air control loop with outside air flow rate sensing according to an embodiment of the present invention.

As illustrated in FIGS. 5-7, the outside air feed-forward controller 82 helps to reduce the overall coupling of the control functions and eliminate or reduce the increase in building pressure 86 from an increase in outside air damper position 98. If outside air feed-forward controller 82 does not precisely compensate for the disturbance in outside air flow rate 92 to eliminate building pressure 86 changes, the building pressure controller 90 can be used to trim out the remaining control error. The building pressure controller 90 can comprise a feedback controller or other known controller-type for controlling various HVAC system 10 components, like the exhaust damper 42, to maintain the desired building pressure 86.

If the differential outside air damper position signal 80 computed by the outside air feed-forward controller 82 exceeds zero, then the outside feed-forward controller 82 will open the exhaust damper 42. The control signal from the outside feed-forward controller 82 provides an increase in the operating of the exhaust damper 42 based on the sum of the differential signals from the outside air feed-forward controller 82 and building pressure controller 90.

If the differential outside air damper signal 80 computed by the outside air feed-forward controller 82 is less than zero, then the outside air feed-forward controller 82 will close the exhaust damper 42. The control signal from the outside feed-forward controller 82 provides a decrease in the opening of the exhaust damper 42 equal to about a fractional value of, for example, eighty percent (80%) of the differential signals from the outside air feed-forward controller 82. Choosing fractional value (e.g. 80%) can reduce the possibility of a rapid, excessive exhaust damper 42 closure, which could cause an objectionable rise in building pressure 86. Also, a margin exists below the building pressure setpoint 88 to allow for some undershoot without causing a low or negative building pressure 86.

If the differential outside air damper position signal 80 computed by the outside air feed-forward controller 82 equals to zero, then the exhaust damper 42 position change depends only on the differential building pressure signal from the building pressure controller 90. The user-adjustable feed-forward control parameters to determine open and close signal sensitivity, such as the feed-forward gain from the outside air damper signal 80 to the exhaust damper position signal, can be applied as well.

The building pressure 86, the building pressure setpoint 88, and other parameters, such as a building pressure control signal, a proportional gain, a reset time, a building pressure deadband, and one or more error signals, among others, vary. The building pressure setpoint 88 can be set, and typically, varies between about −0.05 inches water column (−14.45 Pa) to about 0.15 inches water column (43.46 Pa). The building pressure 86 can typically range from about −0.67 inches water column (−194.2 Pa) to about 0.67 inches water column (194.2 Pa). A time control interval can be, and typically is, set as a constant. A limit control can be applied to this controller as well.

FIGS. 6-7 illustrate an outside air control loop 78. The outside air control loop 78 comprises an outside air controller 96. In one embodiment when the outside air flow rate 92 is estimated as illustrated in FIG. 6, the outside air controller 96 computes an outside air damper position 98 using a outside air damper position setpoint 94. In another embodiment when the outside air flow rate 92 is directly measured as illustrated in FIG. 7, the outside air damper signal 80 outputted to the outside air damper 50 is computed comparing the outside air flow rate 92 and the outside air flow rate setpoint 100.

The outside air controller 96 outputs an outside air damper signal 80 both to position the outside air damper 50 and to the outside feed-forward controller 82. The outside air damper position setpoint 94, the outside air flow rate setpoint 100, outside air damper signal 80, outside air damper position 98 and the outside air flow rate 92, among others, can, and typically, are set to vary during operation. A time control interval can, and typically is, set as a constant.

In addition, the supply fan control loop 58, return pressure control loop 66, and building pressure control system 76 can be enhanced by employing a limit control loop 74. The limit control loop 74 utilizes control logic to maintain building pressure 86 within a desired range. When operating normally, the building pressure 86 is controlled by positioning the exhaust damper 42 as required and the return fan 24 is controlled to the return plenum pressure setpoint 70. The limit control loop 74 need not be triggered.

The limit control loop 74 could be triggered when the exhaust damper 42 is fully opened and the building pressure 86 is too high. If the exhaust damper 42 has opened fully, the limit control loop 74 could be triggered to decrease building pressure 86 by increasing the capacity of return fan 24.

The limit control loop 74 could be triggered when the exhaust damper 42 is fully opened and the building pressure 86 is too high. If the exhaust damper 42 has opened fully, the limit control loop 74 could be triggered to decrease building pressure 86 by increasing the capacity of return fan 24.

During operation of the limit control loop 74, the return fan 24 is controlled to a modified return plenum pressure setpoint 70*d* determined from the building pressure 86 deviation from building pressure setpoint 88. The limit control loop 74 increases the return plenum pressure setpoint 70 through reset control action if the building pressure 86 exceeds the building pressure setpoint 88, up to an effective maximum return plenum pressure setpoint 70*c*, for example, at about 2.0 iwc (578.2 Pa) to 2.5 iwc (772.7 Pa).

The limit control loop 74 reset action is controlled by a linear ramp response (other control is possible if desired). Other methods are contemplated, for example, integral, proportional-integral or proportional-integral-derivative controllers or other controllers capable of responding to non-linear system behavior, for example, fuzzy logic, model-predictive control, artificial intelligence, adaptive control, or scheduled logic. The modified return plenum pressure setpoint 70*d* provides additional return fan capacity as needed to control the building pressure. The effective maximum building pressure setpoint 88*a* could be higher or lower depending on the design requirements of the system. A sufficient differential below the return plenum pressure 68 high limit cutout, 1.0 iwc (289.089 Pa) for example, is maintained.

When the building pressure 86 returns to desired point or range and the exhaust damper 42 begins to close, the controller transitions from the limit control 74 and re-invokes the return fan system 56. Any reset control component applied to the return plenum pressure setpoint 70 is removed and the normal setpoint calculation resumes.

As can be understood from the foregoing, embodiments of the present invention provides automatic adjustment and control of the return plenum pressure 68 and allows an HVAC system 10 with a return fan 24 to be offered with a factory installed, application specific controller. In addition, the return fan control system 56 reduces the dynamic interaction between the multiple control loops that comprise the HVAC system 10, and improves performance of the building pressure control function by reducing the magnitude of building pressure changes when disturbances in outside air flow rate 92 or outside air damper position 98 occur. In addition, the invention provides an alternate, limit control loop 74 if the building pressure setpoint 88 is exceeded and the exhaust damper 42 is fully opened. This limit capability improves the overall robustness of the building pressure control function and allows the system to automatically adapt to changes in system characteristics and to unanticipated load conditions or disturbances.

It should be apparent that variations on the control system described above will be apparent to those skilled in the art. For example, HVAC system 10 may be used with multiple supply fans, return fans, dampers, sensors and/or controls depending on the system design requirements. The control system may be implemented with electronic digital, analog, or a combination of digital/analog control elements and low-voltage wiring. Other conventional pneumatic tubing, transmitters, controllers, and relays are contemplated.

In addition, it should be understood that operation of the HVAC system 10 generally, may be controlled by, for example, a microcomputer control panel that may house various controls described herein and may be located within the building space 20, zones and elsewhere, through wireless zone sensors, that further allows for the reliable operation of the HVAC system 10, including display of operating conditions.

Other controls may be linked to the microcomputer control panel allowing for precise air delivery management of one or more systems from a central location. This system can incorporate pneumatic, electric, electronic, direct digital control, or web-based Direct Digital Controls (DDC) with a variety of limits and dead-band adjustments. Other features not shown may include design air quality features, like demand ventilation control with $CO_2$ sensors, double wall construction through the air handler, demand-control ventilation, fresh air measurement, double slop drain pans, and final filtration capabilities.

It will be readily apparent to one of ordinary skill in the art that the HVAC system 10 disclosed can be readily implemented in other contexts at varying scales. Use of various motor types, drive mechanisms, and configurations with embodiments of this invention should be readily apparent to those of ordinary skill in the art.

The patentable scope of the invention is defined by the claims as described by the above description. While particular features, embodiments, and applications of the present invention have been shown and described, including the best mode, other features, embodiments or applications may be understood by one of ordinary skill in the art to also be within the scope of this invention. It is therefore contemplated that the claims will cover such other features, embodiments or applications and incorporates those features which come within the spirit and scope of the invention.

What is claimed is:

1. A return fan control system for an HVAC system comprising:
   a. a supply fan control loop arranged to control a supply fan to a duct pressure setpoint;
   b. a return pressure control loop comprising a return fan controller arranged to (i) generate a differential pressure between a first return plenum pressure, detected by a return air pressure sensor positioned in a recirculation duct, and a return plenum pressure setpoint, and (ii) automatically control a return fan to second return plenum pressure, wherein the second return plenum pressure being attained by varying a return plenum pressure setpoint with a setpoint reset function utilizing at least two pressure setpoints; and
   c. a building pressure control system operable to substantially attain a building pressure.

2. The return fan control system of claim 1 wherein the supply fan is a constant volume supply fan.

3. The return fan control system of claim 1 wherein the supply fan is a variable volume supply fan.

4. The return fan control system of claim 3 wherein the supply fan control loop further comprises a duct pressure controller, the supply fan control loop arranged to control a supply fan to the duct pressure setpoint.

5. The return fan control system of claim 4 wherein the duct pressure controller comprises a proportional-integral feedback controller and the return pressure controller comprises a proportional-integral feedback controller.

6. The return fan control system of claim 1 wherein the building pressure control system comprises a building pressure control loop and an outside air control loop cooperatively arranged to control an exhaust damper in response to an outside air flow rate.

7. The return fan control system of claim 1 wherein the building pressure control system further comprises the building pressure control loop and an outside air control loop cooperate to reduce an increase in building pressure from a corresponding increase in the outside air flow rate.

8. The return fan control system of claim 1 wherein the building pressure control loop comprises a feedback controller and an outside air feed-forward controller, wherein the feedback controller and the outside air feed-forward controller operate with the outside air control loop.

9. The return fan control system of claim 8 wherein the outside air feed-forward controller outputs an outside air damper signal that exceeds zero and modulates the exhaust damper to proportionally increase an open position of the exhaust damper.

10. The return fan control system of claim 8 wherein outside air feed-forward controller outputs an outside air damper signal that is less than zero and modulates the exhaust damper to proportionally decrease an open position of the exhaust damper.

11. The return fan control system of claim 8 wherein the exhaust damper is closed as a function of the signals from the outside air feed-forward controller and feedback controller.

12. The return fan control system of claim 8 wherein the exhaust damper is opened as a function of the signals from the outside air feed-forward controller and the feedback controller.

13. The return fan control system of claim 1 wherein the outside air feed-forward controller outputs an outside air damper signal that is equal to about zero and the building pressure controller modulates the exhaust damper to change a position of the exhaust damper.

14. The return fan control system of claim 1 further comprising a limit control loop, the return pressure control loop transitions to the limit control loop if the exhaust damper is in a fully open position and a building pressure setpoint is exceeded.

15. The return fan control system of claim 14 wherein the limit control loop decreases the building pressure by modifying the return plenum pressure setpoint determined from a difference between the building pressure and the building pressure setpoint.

16. The return fan control system of claim 14 wherein the limit control increases the return plenum pressure setpoint through a reset control action up to an effective maximum return plenum pressure setpoint.

17. The return fan control system of claim 1 wherein the maximum return plenum pressure setpoint is user-adjustable during operation and the minimum return plenum pressure is fixed for all operating conditions.

18. The return fan control system of claim 1 wherein the maximum return plenum pressure setpoint and the minimum return plenum pressure are user-adjustable during operation.

19. The return fan control system of claim 1 wherein the setpoint reset function determines a return plenum pressure setpoint dependent on a predetermined function based on a maximum return plenum pressure setpoint, a minimum return plenum pressure setpoint and the outside air flow rate.

20. The return fan control system of claim 1 wherein the outside air flow rate is determined based on an estimated outside air flow rate.

21. The return fan control system of claim 1 wherein the outside air flow rate is determined based on a direct measurement of the outside air flow rate.

22. The return fan control system of claim 1 wherein the return plenum pressure setpoint is determined by the setpoint reset function $RP_{set}=RP_{min}+(RP_{max}-RP_{min})*(OA)^2$, where $RP_{set}$ is the return plenum pressure setpoint, $RP_{min}$ is the return plenum pressure minimum setpoint, $RP_{max}$ is the return plenum pressure maximum setpoint and OA is the measured or estimated outside air flow rate.

23. A method of controlling a return fan in an HVAC system having a return fan control loop comprising the steps of:
  a. determining a maximum return plenum pressure setpoint that exceeds a return plenum pressure setpoint;
  b. calculating a minimum return plenum pressure setpoint; and
  c. controlling a return fan with a return fan controller from a first return plenum pressure to a second return plenum pressure, the return fan controller arranged to generate a differential pressure between the first return plenum pressure, detected with a return air pressure sensor positioned in a recirculation duct, and a return plenum pressure setpoint, wherein the second return plenum pressure being attained by varying a return plenum pressure setpoint with a setpoint reset function utilizing at least two pressure setpoints.

24. The method of claim 23 wherein the return plenum pressure setpoint is determined by the setpoint reset function $RP_{set}=RP_{min}+(RP_{max}-RP_{min})*(OA)^2$, where $RP_{set}$ is the return plenum pressure setpoint, $RP_{min}$ is the return plenum pressure minimum setpoint, $RP_{max}$ is the return plenum pressure maximum setpoint and OA is a measured or an estimated outside air flow rate.

25. The method of claim 23 wherein the maximum return plenum pressure setpoint is user-adjustable.

26. The method of claim 23 wherein the maximum return plenum pressure setpoint is computed for the HVAC system if an exhaust damper is positioned to cause maximum exhaust air flow and the HVAC system is operating at full-load air flow with an outside air damper set to allow a maximum outside air intake, minimum return air flow and maintaining the building pressure setpoint.

27. The method of claim 23 wherein the minimum return plenum pressure setpoint is computed for maximum return air conditions and minimum outside air intake.

28. The method of claim 23 wherein the minimum return plenum pressure is set equal to about 0.1 inches water column (28.89 Pa).

29. The method of claim 23 wherein return plenum pressure setpoint ranges from below about 0.1 inches water column (28.89 Pa) to above about 2.5 inches water column (722.7 Pa).

30. A method of controlling an HVAC system having a return fan comprising the steps of:
  a. controlling a supply fan with a supply fan control loop, the supply fan control loop further comprising a supply fan controller that controls the supply fan to a duct pressure in relation to a duct pressure setpoint;
  b. controlling a return fan with a return plenum pressure control loop; the return plenum pressure control loop comprising a return fan controller arranged to (i) generate a differential pressure between a first return plenum pressure, detected by a return air pressure sensor positioned in a recirculation duct, and a return plenum pressure setpoint, and (ii) automatically control a return fan to a second return plenum pressure, wherein the second return plenum pressure being attained by varying a return plenum pressure setpoint with a setpoint reset function utilizing at least two pressure setpoints; and c. controlling a building pressure with a building pressure control system.

31. The method of claim 30 wherein the setpoint reset function determines a return plenum pressure setpoint as a predetermined relation among a maximum return plenum pressure setpoint, a minimum return plenum pressure setpoint and an outside air flow rate and the outside air flow rate is determined based on an estimated outside air flow rate.

32. The method of claim 30 wherein the setpoint reset function determines a return plenum pressure setpoint as a predetermined relation among a maximum return plenum pressure setpoint, a minimum return plenum pressure setpoint and an outside air flow rate and the outside air flow rate is determined based on a direct measurement of the outside air flow rate.

33. The method of claim 30 wherein the return plenum pressure setpoint is determined by the setpoint reset function $RP_{set}=RP_{min}+(RP_{max}-RP_{min})*(OA)^2$, where $RP_{set}$ is the return plenum pressure setpoint, $RP_{min}$ is the return plenum pressure minimum setpoint, $RP_{max}$ is the return plenum pressure maximum setpoint and OA is a measured or an estimated outside air flow rate.

34. The method of claim 30 wherein the building pressure control system comprises a building pressure control loop and an outside air control loop cooperatively arranged to control an exhaust damper in response to an outside air flow rate.

35. The method of claim 30 wherein the setpoint reset function determines a return plenum pressure setpoint as a predetermined relation among a maximum return plenum pressure setpoint, a minimum return plenum pressure setpoint and an outside air flow rate, and the building pressure control loop comprises a feedback controller and an outside air feed-forward controller, wherein the feedback controller and the outside air feed-forward controller operate with the outside air control loop.

36. The method of claim 30 wherein the building control system comprises a building pressure control loop and an outside air control loop cooperate to reduce an increase in building pressure from a corresponding increase in the outside air intake.

37. The methods of claim 30 further comprising the step of:

a. transitioning the building pressure control loop to a limit control loop if the exhaust damper is fully open position and the building pressure exceeds the building pressure setpoint in relation to a maximum return plenum pressure setpoint.

38. The method of claim 37 further comprising the step of:

a. controlling the building pressure by increasing the return plenum pressure setpoint through a reset control action of the limit control loop up to an effective maximum return plenum pressure setpoint.

39. The method of claim 37 further comprising the step of:

a. transitioning from the limit control loop to the return pressure control loop when determined by the limit control loop.

* * * * *